(12) United States Patent
Privatera

(10) Patent No.: US 9,630,531 B1
(45) Date of Patent: Apr. 25, 2017

(54) VEHICLE CHILD SEAT COVER

(71) Applicant: MaryRose Privatera, Niagara Falls, NY (US)

(72) Inventor: MaryRose Privatera, Niagara Falls, NY (US)

(*) Notice: Subject to any disclaimer, the term of this patent is extended or adjusted under 35 U.S.C. 154(b) by 0 days.

(21) Appl. No.: 15/158,714

(22) Filed: May 19, 2016

Related U.S. Application Data

(60) Provisional application No. 62/163,481, filed on May 19, 2015.

(51) Int. Cl.
*B60N 2/28* (2006.01)
*B60N 2/60* (2006.01)

(52) U.S. Cl.
CPC ......... *B60N 2/2881* (2013.01); *B60N 2/2866* (2013.01); *B60N 2/6027* (2013.01)

(58) Field of Classification Search
CPC ..... B60N 2/2881; B60N 2/866; B60N 2/6027
USPC .............................. 297/219.12, 228.12, 229
See application file for complete search history.

(56) References Cited

U.S. PATENT DOCUMENTS

| 2,652,183 | A | * | 9/1953 | Hlivka | ................ | A47D 15/006 |
| | | | | | | 297/229 |
| 4,478,453 | A | | 10/1984 | Schutz | | |
| 5,845,967 | A | | 12/1998 | Kane et al. | | |
| 6,951,367 | B1 | * | 10/2005 | Dinnan | ................ | B60N 2/449 |
| | | | | | | 297/228.12 |
| 7,229,132 | B2 | | 6/2007 | Meeker et al. | | |
| 7,556,314 | B2 | | 7/2009 | Friedland et al. | | |
| 7,686,392 | B2 | | 3/2010 | Kenny | | |
| 8,360,519 | B1 | | 1/2013 | Hsu | | |
| 8,371,650 | B2 | | 2/2013 | King | | |
| 8,950,807 | B2 | * | 2/2015 | Lerm | .................... | A47C 7/744 |
| | | | | | | 297/219.12 |
| 2007/0170759 | A1 | | 7/2007 | Nolan et al. | | |
| 2012/0019033 | A1 | | 1/2012 | Kelly | | |

FOREIGN PATENT DOCUMENTS

EP        0154427 A2    2/1985

\* cited by examiner

*Primary Examiner* — Anthony D Barfield
(74) *Attorney, Agent, or Firm* — Robert C Montgomery; Montgomery Patent & Design LP.

(57) ABSTRACT

A seat cover configured to be removably attached to a child vehicle seat is provided with a compartment to enable a booster seating insert to be inserted into and secured. The cover is further provided with a plurality of straps, having fasteners, to secure the cover to the child vehicle seat.

20 Claims, 4 Drawing Sheets

VEHICLE CHILD SEAT COVER

RELATED APPLICATIONS

The present invention is a continuation-in-part of, was first described in, and claims the benefit of U.S. Provisional Application No. 62/163,481, filed May 19, 2015, the entire disclosures of which are incorporated herein by reference.

FIELD OF THE INVENTION

The present invention relates generally to the field of universal removable vehicle seat cover and booster seat height pad systems and more specifically relates to washable removable child seat covers and removable height boosting pads.

BACKGROUND OF THE INVENTION

The booster seat is used for children who are outgrowing the conventional car seat and still not old enough to sit alone in a conventional car seat. Booster seats are designed to improve the placement of the seat restraint in order to prevent injuring a child during an accident. They are often further designed as a secondary precautionary protection device by providing another barrier for a child in cases of collisions, especially from the side impacts.

A child is not lawfully able to sit in a car without a safety seat until they reach a specific age or weight. As they grow older different types of vehicle car seats may be used to ensure a child's safety. When a child reaches approximately thirty to forty pounds (30-40 lbs.), a booster seat may be used in a vehicle. Some children reach the weight limit to transition to a booster seat, but are not tall enough for the seat restraint to fit correctly and safely on their body.

During the years of use a child booster seat often have to withstand a large amount of soiling, including fluid spillage, food spillage, body fluid spoilages, amongst other wear and tear. Often, vehicle booster seats have a fabric covering, which bear a large volume of wear and tear from a child. There is a clear need for an easy and affordable way to improve booster seat clean up and functionality.

Various attempts have been made to solve problems found in booster seat cover art. Among these are found in U.S. Pat. and U.S. Pat. App. Pub. Nos. 2010/0109399 to Elizabeth B. Rockwell; 2013/0229036 to Leo Willard Bill, III; U.S. Pat. No. 7,740,314 to Allen Friedland; 2005/0082886 to Paige Sganga; and U.S. Pat. No. 7,422,278 to Thomas E. McConnell. These prior art references are representative of vehicle seat covers and removable seat cushions.

None of the above inventions and patents, taken either singly or in combination, is seen to describe the invention as claimed. Thus, a need exists for a reliable universal removable vehicle seat cover and booster seat height pad system, and to avoid the above-mentioned problems.

SUMMARY OF THE INVENTION

It is therefore an object of the present invention to provide such a covering for a child vehicle seat that is capable of receiving at least one (1) cushioned insert capable of being retained within a compartment. In such an arrangement, the covering can be removably attached to the child vehicle seat such that the cushioned insert can be used as a booster seat by an occupant while maintaining the overall outward appearance of a continuous vehicle seat cover without the unsightly and protruding features of a typical booster seat.

In at least one (1) embodiment of the invention, the covering includes a waterproof, flexible fabric having a back portion and a bottom portion. The compartment for retaining each insert therein is located on the rear surface of the bottom portion. At least one (1) pair of upper straps are located at opposing perimeter edges of the back portion, each having an attachment means at distal ends thereof for removably attaching to themselves. An upper portion of the vehicle seat is retained within the pair of upper straps when they are conjoined. Similarly, at least one (1) pair of lower straps are located at opposing perimeter edges of the bottom portion, each having an attachment means at distal ends thereof for removably attaching to themselves. A lower portion of the vehicle seat is retained within the pair of lower straps when they are conjoined. In a preferred embodiment, the attachment means for both the upper and lower straps are conventional buckle fasteners commonly associated with child harness fasteners.

Another object of the present invention is to provide a cover flap that has a first side affixed to or an integral part of the rear surface of the bottom portion and adjacent to the compartment opening. The second side of the cover flap has a fastener that is capable of mating with a corresponding fastener located on the rear surface of the bottom portion on the other side of the compartment opening, thereby to fully retain the insert or inserts therein.

Another object of the invention is to provide at least one (1) cushioned insert that is configured to be fully retained with the compartment when the fasteners of the cover flap and bottom portion are attached. In a preferred embodiment, each cushion is generally wedge-shaped. In the embodiments where multiple inserts are being used, the compartment is configured to enable multiple inserts to be retained therein in a stacked arrangement.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
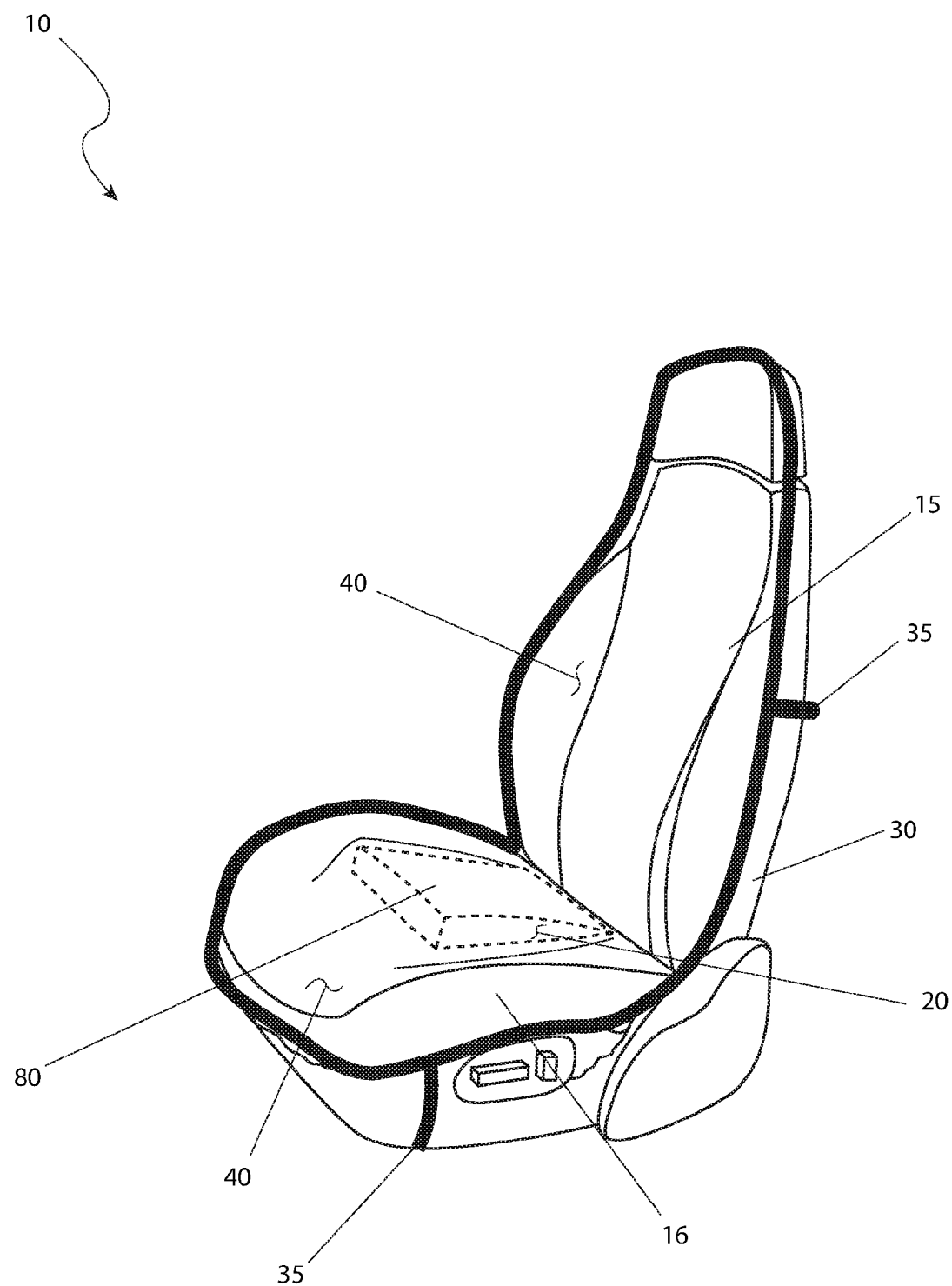
FIG. 1 is a front environmental perspective view of the seat cover/booster seat 10, shown in an installed state upon a conventional vehicle seat 30 according to a preferred embodiment of the present invention.

DESCRIPTIVE KEY 8a first lower strap
8b second lower strap
9a first upper strap
9b second upper strap
10 seat cover
11 first buckle
12 second buckle
15 back portion
16 bottom portion 20 compartment
22 cover flap
23 fastener
30 conventional vehicle seat
35 strap system
40 flexible fabric cover
45 height dimension
50 occupant
55 lap restraint
60 shoulder restraint
65 conventional seat belt buckle
80 foam cushion

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention is directed to a universal removable seat cover/booster seat 10, useful for providing a user, such as a parent, with a convenient means to attach the seat cover/booster seat 10, to a conventional vehicle seat 30 and insert the proper height adjusting foam cushion 80 in order to accommodate a child's stature relative to a desired and safe seating position within a motor vehicle utilizing the vehicle provided restraint system for a "ready for use" condition Referring now to FIG. 1, a seat cover 10, (herein referred to as the "device") 10 is installed on and over a conventional vehicle seat 30. The device 10 is held in place via a strap system 35 which will be described in greater detail herein below. The device 10 is intended to be universal in nature and can work with bucket seats, sport seats, bench seats and the like. The depiction of the conventional vehicle seat 30 as represented in FIG. 1 or any other figure is for illustrative purposes only and as such should not be interpreted as a limiting factor of the present invention. As shown, the device 10 may comprise a flexible fabric cover 40 fully encasing the seat upper surface and forward facing rear surface of the conventional vehicle seat 30 using a bottom portion 16 and back portion 15 respectively. The bottom portion 16 is provided with a compartment 20. A foam cushion 80 is then inserted into the compartment 20 so as to provide an increase in seat height or "boost" to the occupant of the conventional vehicle seat 30. The foam cushion 80 is generally wedge-shaped, and is shown via hidden lines to depict its concealment within the compartment 20.

Figure 2:
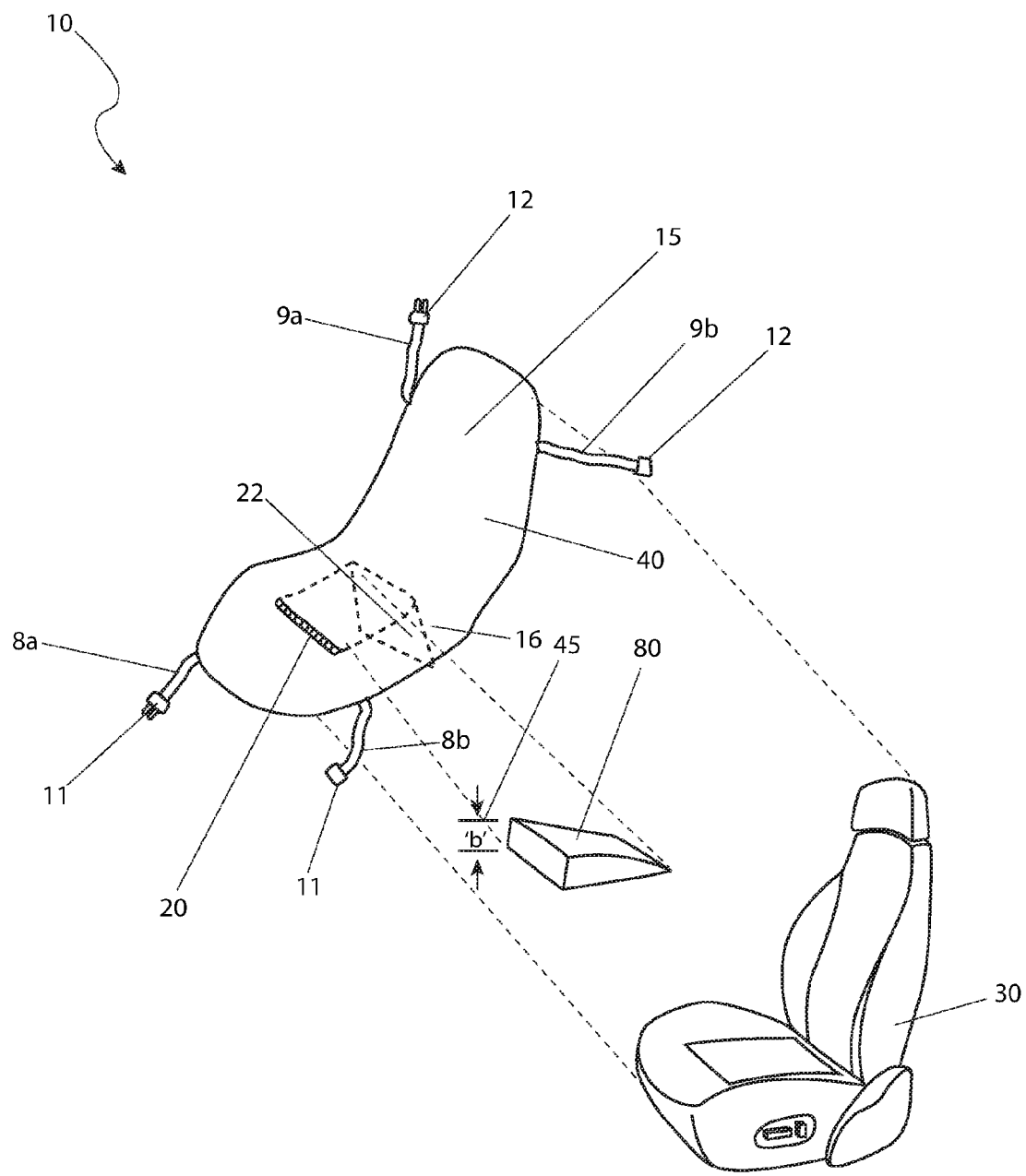
FIG. 2 is an exploded parts diagram depicting the major components of the seat cover/booster seat 10, according to a preferred embodiment of the present invention.

Referring next to FIG. 2, an exploded parts diagram depicting the major components of the device 10, according to a preferred embodiment of the present invention is shown. The device 10, utilizing primarily the back portion 15 and bottom portion 16 to cover and protect the conventional vehicle seat 30 is held in place with a first lower strap 8a, a second lower strap 8b, a first upper strap 9a, and a second upper strap 9b. Said straps are envisioned to be made of nylon and secure around the bottom and rear of the conventional vehicle seat 30 respectively. The distal end of first lower strap 8a and second lower strap 8b is provided with a first buckle 11, while the distal end of first upper strap 9a and second upper strap 9b is provided with a second buckle 12. Other types of fastening means such as snaps, hook and loop fastener, buttons/button holes, elastic, and the like could be used with equal effectiveness, and as such, should not be interpreted as a limiting factor of the present invention. In tandem, the first and second buckles 11, 12 secure the device 10 and virtually prevent any movement of the device 10 relative to the conventional vehicle seat 30. The proximal end of each of the first lower strap 8a and second lower strap 8b are affixed to side locations of the bottom portion 16. The proximal end of each of the first upper strap 9a and second upper strap 9b are affixed to side locations of the back portion 15. Other locations of the proximal end attachment to the flexible fabric cover 40 is appreciated.

Figure 3:
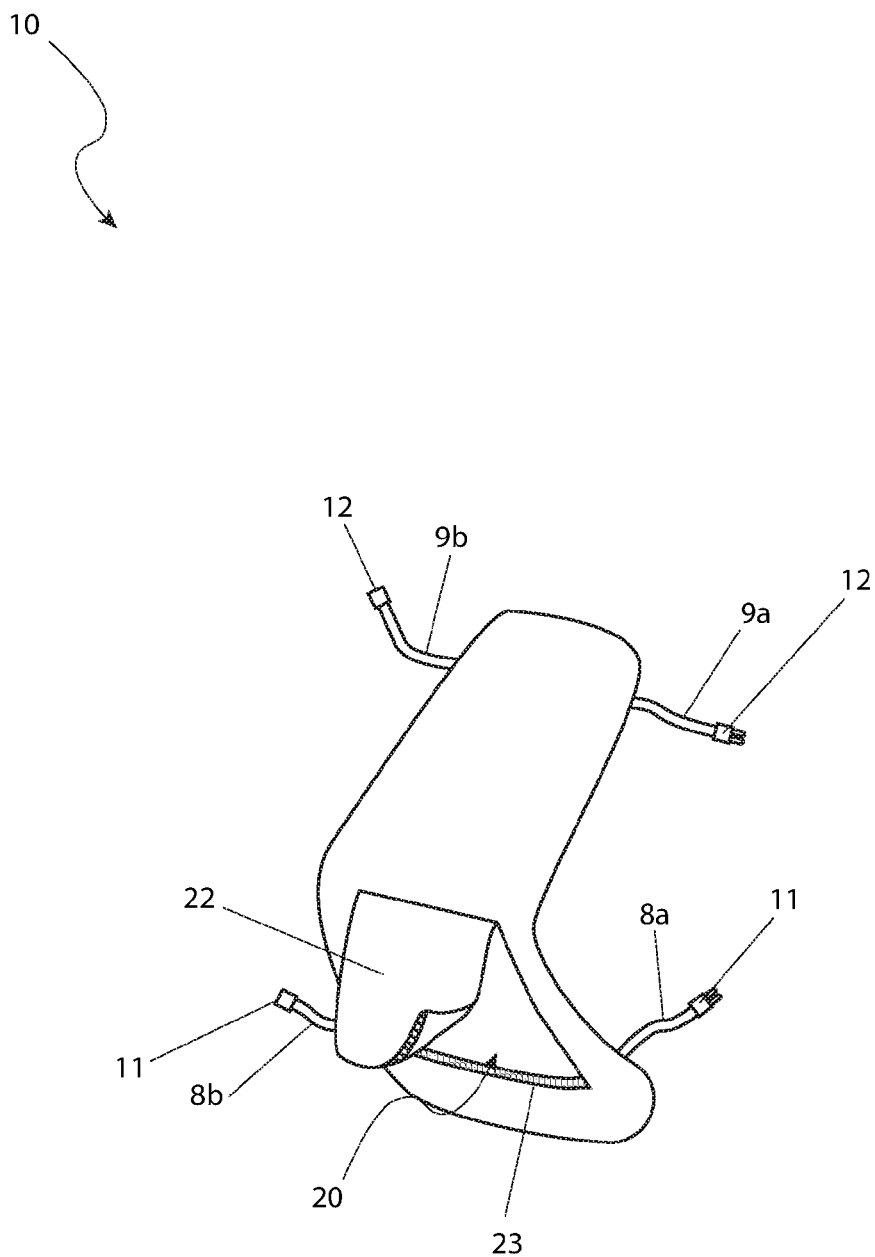
FIG. 3 is a rear perspective view of the seat cover/booster seat 10, according to a preferred embodiment of the present invention; and, FIG. 4 is a front environmental perspective view of the seat cover/booster seat 10 in a utilized state, according to a preferred embodiment of the present invention.

As aforementioned described, and as illustrated in FIG. 3, the foam cushion 80 is placed into the compartment 20 of the bottom portion 16 and secured in place with the cover flap 22 and fastener 23. The compartment 20 is located on the underside of the bottom portion 16. The flap 22 is affixed at least on one (1) side to the bottom portion 16 and in certain embodiments, comprises a continuation of the material of the bottom portion 16. In embodiments where the flap 22 is generally rectangular, the flap 22 is a three-sided piece of material, with the fourth side attached to or a continuation of the bottom portion 16. The side opposite the side attached to or a continuation of the bottom portion 16 has a fastener 23. The fastener 23 is envisioned to be one-half (½) of a hook-and-loop fastener such as VELCRO® so as to provide ready access. The other half of the hook-and-loop fastener is on the exterior of the underside of the bottom portion 23. Such a fastener 23 enables quick detachment and access to the compartment 20, either for inserting or removing the foam cushion 80. Other fasteners 23 can be appreciated, such as snap buttons, zippers, or similar devices associated with easy detachment.

It is envisioned that foam cushion 80 could be provided in varying heights to provide different amounts of height increase for the occupants of the device 10. Smaller, younger, or shorter children would utilize a foam cushion 80 with a larger height dimension 45 while larger, older, or taller children would utilize a foam cushion 80 with a smaller height dimension 45. Similarly, the device 10 could be utilized without a foam cushion 80 for children of an acceptable size (those not legally requiring the use of a car seat or booster seat) while still providing the physical stain and dirt protection provided by the flexible fabric cover 40. In other embodiments of the present invention, the device 10 may accommodate more than one (1) quantity of foam cushion 80 allowing incremental usage of multiple foam cushions 80 in a stacked configuration to obtain the proper height dimension 45.

Figure 4:
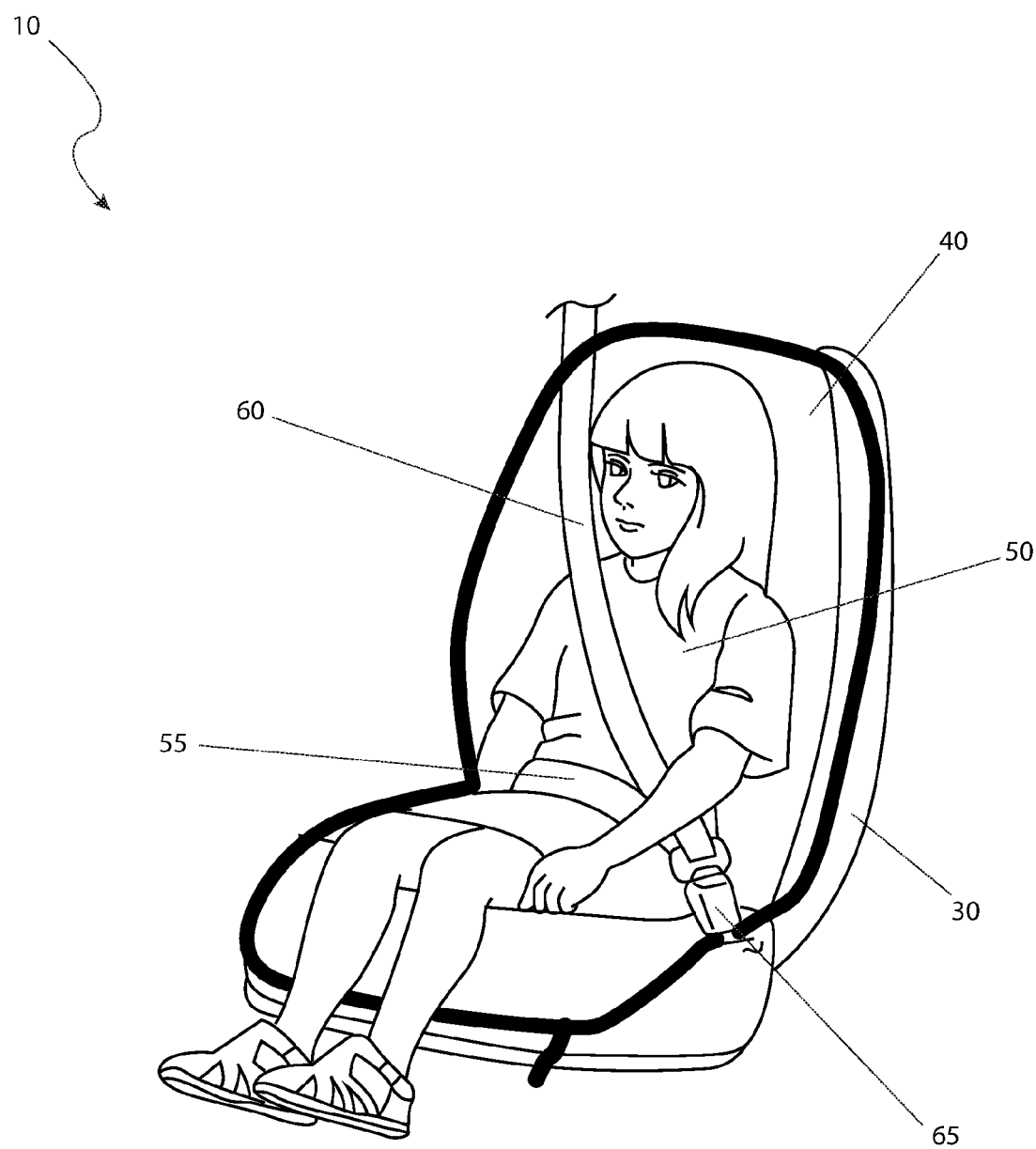

Referring finally to FIG. 4, a perspective view of the device 10, in a utilized state, according to a preferred embodiment of the present invention is disclosed. An occupant 50 is seated upon the device 10 as would be conventionally expected. A lap restraint 55 and shoulder restraint 60 in conjunction with a conventional seat belt buckle 65 is used to safely secure the occupant 50 to prevent injury should a motor vehicle accident occur. It will be appreciated that the placement of the device 10 does not interfere with normal usage and operation of the conventional seat belt buckle 65. The flexible fabric cover 40 is envisioned to be made of a waterproof fabric such as neoprene that will protect the underlying surface of the conventional vehicle seat 30 from stains or soiling. The flexible fabric cover 40 will withstand a large amount of soiling, including fluid spillage, food spillage, body fluid spillage, contact with dirty clothes, dirty hands, and other properties typically associated with children. The removability of the device 10 allows for removing the foam cushion 80 (as shown in FIGS. 1 and 2) from the flexible fabric cover 40 and washing the flexible fabric cover 40 in a clothes washing machine prior to drying and reinstalling upon the conventional vehicle seat 30.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A seat covering, comprising:
   a seat cover, comprising:
      a back portion;
      a bottom portion;
      an upper fastening means located on said back portion;
      a lower fastening means located on said bottom portion;
      a compartment located within said bottom portion, accessible through a compartment opening of a rear surface thereof; and,
      a cover flap protruding away from said rear surface of said bottom portion, adjacent said compartment opening, and removably fastened to said rear surface of said bottom portion to selectively cover or reveal said compartment; and,
   an insert comprising a size capable of being fully retained within said compartment;
   wherein said seat cover is configured to fully encase a child vehicle seat, such that said back portion rests on a seat back portion thereof, and said bottom portion rests on a seat bottom portion thereof;
   wherein said upper fastening means is capable of removably securing to itself in order to retain said seat cover on an upper portion of said child vehicle seat;
   wherein said lower fastening means is capable of removably securing to itself in order to retain said seat cover on a lower portion of said child vehicle seat;
   wherein said cover flap is sized to cover said insert when residing within said compartment; and,
   wherein said insert is configured to provide a cushioning seat for an occupant residing within said child vehicle seat.

2. The seat covering of claim 1, wherein said back portion and said bottom portion comprise a flexible fabric material.

3. The seat covering of claim 2, wherein said back portion and said bottom portion comprises a waterproof material.

4. The seat covering of claim 1, wherein said upper fastening means is a pair of upper straps, each affixed to opposing perimeter edges of said back portion, and each having a fastener located at distal ends thereof for correspondingly fastening to each other.

5. The seat covering of claim 1, wherein said lower fastening means is a pair of lower straps, each affixed to opposing perimeter edges of said bottom portion, and each having a fastener located at distal ends thereof for correspondingly fastening to each other.

6. The seat covering of claim 4, wherein said lower fastening means is a pair of lower straps, each affixed to opposing perimeter edges of said bottom portion, and each having a fastener located at distal ends thereof for correspondingly fastening to each other.

7. The seat covering of claim 1, wherein said cover flap has a first side affixed to said rear surface of said bottom portion adjacent a first side of said compartment and a first fastener located on at least a portion of an opposing second side for removable attachment to a corresponding second fastener located adjacent a second side of said compartment on said rear surface of said bottom portion.

8. The seat covering of claim 6, wherein said cover flap has a first side affixed to said rear surface of said bottom portion adjacent a first side of said compartment and a first fastener located on at least a portion of an opposing second side for removable attachment to a corresponding second fastener located adjacent a second side of said compartment on said rear surface of said bottom portion.

9. The seat covering of claim 1, wherein said insert further comprises a foam cushion.

10. The seat covering of claim 9, wherein said insert is generally wedge-shaped.

11. A seat covering, comprising:
    a back portion;
    a bottom portion;
    an upper fastening means located on said back portion;
    a lower fastening means located on said bottom portion;
    a compartment located within said bottom portion, accessible through a compartment opening of a rear surface thereof; and,
    a cover flap protruding away from said rear surface of said bottom portion, adjacent said compartment opening, and removably fastened to said rear surface of said bottom portion to selectively cover or reveal said compartment;
    wherein said seat cover is configured to fully encase a child vehicle seat, such that said back portion rests on a seat back portion thereof, and said bottom portion rests on a seat bottom portion thereof;
    wherein said upper fastening means is capable of removably securing to itself in order to retain said seat cover on an upper portion of said child vehicle seat;
    wherein said lower fastening means is capable of removably securing to itself in order to retain said seat cover on a lower portion of said child vehicle seat;
    wherein said compartment is capable of fully retaining at least one insert therein, providing a cushioning seat for an occupant residing within said child vehicle seat; and,
    wherein said cover flap is sized to cover each insert when residing within said compartment.

12. The seat covering of claim 11, wherein said back portion and said bottom portion comprise a flexible fabric material.

13. The seat covering of claim 12, wherein said back portion and said bottom portion comprises a waterproof material.

14. The seat covering of claim 11, wherein said upper fastening means is a pair of upper straps, each affixed to opposing perimeter edges of said back portion, and each having a fastener located at distal ends thereof for correspondingly fastening to each other.

15. The seat covering of claim 11, wherein said lower fastening means is a pair of lower straps, each affixed to opposing perimeter edges of said bottom portion, and each having a fastener located at distal ends thereof for correspondingly fastening to each other.

16. The seat covering of claim 14, wherein said lower fastening means is a pair of lower straps, each affixed to opposing perimeter edges of said bottom portion, and each having a fastener located at distal ends thereof for correspondingly fastening to each other.

17. The seat covering of claim 11, wherein said cover flap has a first side affixed to said rear surface of said bottom portion adjacent a first side of said compartment and a first fastener located on at least a portion of an opposing second side for removable attachment to a corresponding second fastener located adjacent a second side of said compartment on said rear surface of said bottom portion.

18. The seat covering of claim 16, wherein said cover flap has a first side affixed to said rear surface of said bottom portion adjacent a first side of said compartment and a first fastener located on at least a portion of an opposing second side for removable attachment to a corresponding second fastener located adjacent a second side of said compartment on said rear surface of said bottom portion.

19. A method of providing a booster seat covering to an existing child vehicle seat comprises the following steps:
providing said booster seat covering, comprising:
   a back portion;
   a bottom portion having a first fastener located on a rear surface thereof;
   an upper fastening means located on opposing side edges of said back portion;
   a lower fastening means located on opposing side edges of said bottom portion;
   a compartment located within said bottom portion, accessible through a compartment opening of said rear surface thereof; and,
   a cover flap having a first side affixed to said rear surface of said bottom portion adjacent said compartment, protruding away therefrom, and having a second fastener located on an opposing second side;
inserting a cushioned insert within said compartment;
mating said first fastener to said second fastener, thereby fully covering said compartment with said cover flap;
placing said booster seat covering on said child vehicle seat, such that said back portion rests against a seat back portion and said cushioned insert within said bottom portion rests against said seat bottom portion;
conjoining said upper fastening means around an upper portion of said child vehicle seat, thereby securing said booster seat covering thereto; and,
conjoining said lower fastening means around a lower portion of said child vehicle seat, thereby securing said booster seat covering thereto.

20. The method of 19, further comprising the step of:
inserting at least another cushioned insert in a stacked arrangement within said compartment.

\* \* \* \* \*